United States Patent

Hubbard et al.

[11] Patent Number: 6,093,354
[45] Date of Patent: Jul. 25, 2000

[54] METHOD OF CONTINUOUSLY CURING A SHEET FORMED OF EPDM MATERIAL

[75] Inventors: Michael J. Hubbard, Holland; Walter J. Kelly, Wadsworth; Anthony Verrocchi, Akron; Raymond J. Weinert, Macedonia, all of Ohio

[73] Assignee: Omnova Solutions Inc., Fairlawn, Ohio

[21] Appl. No.: 09/203,165

[22] Filed: Dec. 1, 1998

[51] Int. Cl.[7] ............................. B32B 31/06; B29C 71/02
[52] U.S. Cl. ................. 264/171.1; 156/228; 156/244.11; 264/175; 264/176.1; 264/236
[58] Field of Search ................................ 264/171.1, 175, 264/176.1, 211.24, 236, 173.11, 173.16, 173.19; 156/228, 244.11

[56] References Cited

U.S. PATENT DOCUMENTS

| | | | |
|---|---|---|---|
| 4,220,579 | 9/1980 | Rinehart | 260/33.6 |
| 4,337,112 | 6/1982 | Hollis | 156/351 |
| 4,707,413 | 11/1987 | Kehr et al. | 428/440 |
| 4,724,107 | 2/1988 | Barrows | 264/25 |
| 4,771,090 | 9/1988 | Jehr et al. | 524/68 |
| 4,803,020 | 2/1989 | Valaitis et al. | 264/22 |
| 4,894,408 | 1/1990 | Hazelton et al. | 524/425 |
| 5,415,822 | 5/1995 | Cook | 264/171 |
| 5,486,249 | 1/1996 | Valaitis et al. | |
| 5,714,545 | 2/1998 | Lee et al. | 525/193 |
| 5,733,621 | 3/1998 | Cotskis et al. | 428/42.3 |

OTHER PUBLICATIONS

*Rubber Technology* 3rd edition, ed. Maruice Morton, Van Nostrand Reinhold, 1987, pp. 260–283.

*Primary Examiner*—Jan H. Silbaugh
*Assistant Examiner*—Mark Eashoo
*Attorney, Agent, or Firm*—Robert F. Rywalski; Larry R. Meenan

[57] ABSTRACT

A method of continuously manufacturing and curing in-line a sheet of ethylene-propylene diene monomer to form an EPDM roofing membrane. The method includes the steps of forming a continuous sheet material of ethylene-propylene diene monomer and then continuously heating and pressing the sheet material to partially cure the sheet material and remove any voids within the sheet material. The partially cured sheet material is then continuously fed through a curing oven to fully cure the sheet material to form EPDM roofing membrane.

22 Claims, 3 Drawing Sheets

METHOD OF CONTINUOUSLY CURING A SHEET FORMED OF EPDM MATERIAL

FIELD OF THE INVENTION

This invention relates to a method of continuously curing a sheet material formed of EPDM material. More particularly, this invention relates to a method of continuously manufacturing and curing in-line a sheet material of EPDM to form an EPDM roofing membrane.

BACKGROUND OF THE INVENTION

A roof system generally includes a roof deck that is considered the structural supporting surface of a building extending between surrounding exterior walls of the building. The roof deck may be constructed from plywood, metal decking or concrete or any other suitable material. If desired, the roofing system may also include an insulation barrier formed from polyisocyanurate or any other suitable material applied over the roof deck.

To make the roof system weather resistant, a membrane roof may be installed over the roof deck. A membrane roof refers to a water impermeable sheet of polymeric material such as thermoplastic olefins, chlorinated polyethylene, polyvinyl chloride, chlorosulfonated polyethylene or ethylene propylene diene rubber (EPDM). The sheet may be a single-ply or a multi-ply sheet material. The membrane roof may be mechanically fastened over the roof deck using a variety of different methods well known in the art.

The membrane roof may be formed using a variety of techniques well known in the art. For example, see U.S. Pat. Nos. 4,337,122; 4,343,667 and 5,486,249, incorporated herein by reference.

Although the various methods of forming EPDM roofing membrane have been proven to be satisfactory, further improvements of forming EPDM roofing membrane are desired. It is an object of the present invention to provide a method of continuously curing a sheet material formed of EPDM material. It is another object of the present invention to provide a method of continuously manufacturing and curing in-line a sheet material of EPDM to form an EPDM roofing membrane. Yet another object of the present invention is to provide a method of continuously manufacturing and curing in-line multi-ply sheet materials to form an EPDM roofing membrane. Still another object of the present invention is to provide a method continuously manufacturing and curing in-line a sheet material to form an EPDM roofing membrane that is simple and economical to use.

SUMMARY OF THE INVENTION

Briefly, the present invention relates to a method of continuously manufacturing and curing in-line a sheet of ethylene-propylene diene termonomer to form an EPDM roofing membrane. The method includes the steps of forming a continuous sheet material of ethylene-propylene diene termonomer and then continuously heating and pressing the sheet material to partially cure the sheet material and prevent any voids from forming within the sheet material. The partially cured sheet material is then continuously fed through a curing oven to fully cure the sheet material to form EPDM roofing membrane.

BRIEF DESCRIPTION OF THE DRAWINGS

Further features and other objects and advantages of this invention will become clear from the following detailed description made with reference to the drawings in which.

DETAILED DESCRIPTION OF THE PREFERRED EMBODIMENTS

Figure 1:
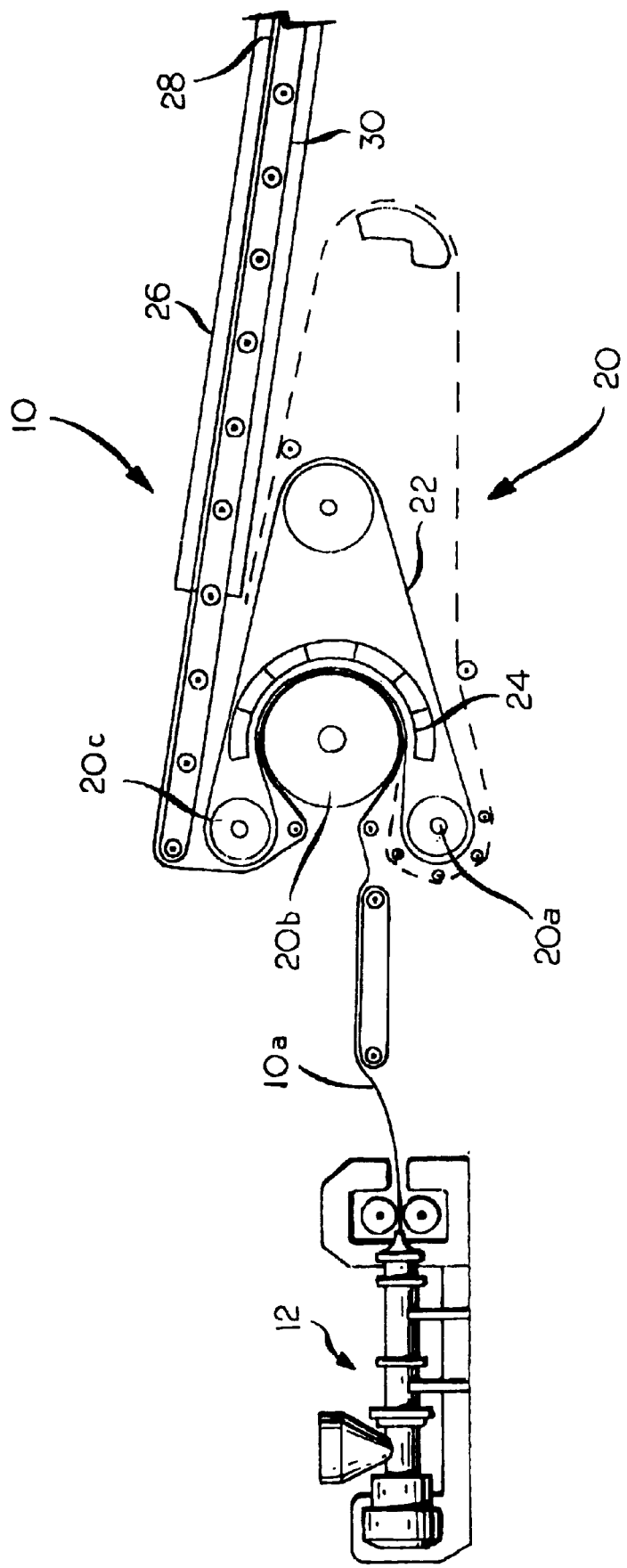
FIG. 1 is a side view of one embodiment of a method of curing a sheet formed of EPDM material.

In the following description, like reference characters designate like or corresponding parts. The present invention is directed to a method of curing a sheet material 10 formed of EPDM material. The term "sheet material" refers to a single-ply or a multi-ply material. Furthermore, the term "EPDM" is intended to mean a terpolymer of ethylene, propylene and diene monomers with the residual unsaturation portion of the diene in the side chain. Illustrative methods for preparing such terpolymers are found in U.S. Pat. No. 3,280,082, the disclosure of which is incorporated herein by reference. The preferred polymers having from about 60 to about 95 weight percent ethylene and from about zero to about 12 weight percent, preferably about 4–6 weight percent, of the diene with the balance of the polymer being propylene or some other similar olefin type polymer.

The diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,5-hexadiene, 1,4-heptadiene, 2-methyl-1,5-hexadiene, cyclooctadiene, 1,4-octadiene, 1,6-octadiene, 5-ethylidene-2-norbomene, 5-n-propylidene-2-norbornene, 5-(2-methyl-2-butenyl)-2-norbornene and the like. A typical EPDM is Vistalon® MD-744 (Exxon Chemical Co.) a terpolymer having a Mooney Viscosity (ML/4 at 125 C.) of about 52; an ethylene/propylene (E/P) ratio of 61/39 weight percent and 2.7 weight percent of unsaturation.

Particularly useful and preferred in preparing a sulfur curable EPDM composition is Royalene® 3180 (Uniroyal Chemical Co.) which has a Mooney Viscosity (ML/4 at 120° C.) of about 54; an ethylene/propylene ratio of about 67/33 weight percent; about 2.2 weight percent of unsaturation (5-ethylidene-2-norbornene); about 2.7 percent by weight of crystallinity and a weight average molecular weight of approximately 313,000 to 355,000. Also useful are thermoplastic heat seamable sheeting materials, i.e., EPDM's having a high degree of crystallinity as opposed to amorphous (non-crystalline) EPDM's. Examples thereof include Royalene® 375 (Uniroyal Chemical Co.); and EPsyn® 5508.

The composition employed to form the sheeting material comprises 100 parts by weight of EPDM or other similar olefinic type polymers, including mixtures of two or more types, to which are added fillers and processing materials as well as other components including curatives as well known in the art. The curatives include, for example, organic polyamines, organic polyacids, organic polyesters, organic polyanhydrides, organic polysulfides and precursors thereof With respect to the fillers, suitable fillers are selected from the group consisting of reinforcing and non-reinforcing materials, and mixtures thereof, as are customarily added to rubber. Examples include such materials as carbon black, ground coal, calcium carbonate, clay, silica, cryogenically ground rubber and the like. Preferred fillers include carbon black, ground coal and cryogenically ground rubber. Carbon black is used in an amount of about 20 parts to about 300 parts per 100 parts of polymer (phr), preferably about equal to the amount or carbon black normally used in preparing sulfur cured EPDM roof sheeting. The carbon black useful herein is any carbon black. Preferred are furnace blacks such as GPF (general purpose furnace), FEF (fast extrusion furnace) and SRF (semi-reinforcing furnace).

The ground coal employed as a filler in the compositions of the invention is a dry, finely divided black powder derived from a low volatile bituminous coal. The ground coal has a particle size ranging from a minimum of 0.26 microns to a maximum of 2.55 microns with the average particle size of 0.69±0.46 as determined on 50 particles, using Transmission Electron Microscopy. The ground coal produces an aqueous slurry having a pH of about 7.0 when tested in accordance with ASTM D-15 12. A preferred ground coal of this type is designated Austin Black which has a specific gravity of 1.22±0.03, an ash content of 4.58% and a sulfur content of 0.65%. Austin Black is commercially available from Coal Fillers, Inc., P.O. Box 1063, Bluefield, Va. Amounts range from about 5 to 65 phr with about 15 to 35 being preferred.

Finally, essentially any ground recycled rubber may be employed as a filler in the composition of the invention. The preferred ground recycled rubbers are cryogenically ground EPDM, butyl, neoprene and the like. A preferred cryogenically ground rubber is a cryogenically ground EPDM rubber. The preferred cryogenically ground EPDM rubber is a fine black rubbery powder having a specific gravity of 1.129±0.015 and a particle size ranging from about 30 to about 300 microns with an average particle size ranging from about 50 to about 80 microns. Amounts range from about 5 to 40 phr with about 10 to 25 phr being preferred.

Mixtures of Austin black and cryogenically ground rubber useful herein may be utilized as a partial replacement for carbon black. Where mixtures of these two fillers are employed the relative amounts thereof can be widely varied; the overall total not exceeding about 60 phr. The ratio of Austin black to cryogenically ground rubber may range from a desired ratio of 2:1 to perhaps even a ratio of 3:1. Again, as noted hereinabove, other filler materials can be employed. Amounts of these filler materials fall within the range of amounts normally employed in preparing sulfur cured conventional roof sheeting.

With respect to the processing material, it is included to improve the processing behavior of the composition (i.e. reduce mixing time and increase rate of sheet forming and includes processing oils, waxes and the like). The processing oil is included in an amount ranging from about 20 parts to about 150 parts process oil per 100 parts EPDM ingredient phr, preferably in an amount ranging from about 60 to about 100 phr. A preferred processing oil is a paraffinic oil, e.g. Sunpar 2280 which is available from the Sun Oil Company. Other petroleum derived oils including naphthenic oils may be used.

Optional ingredients include, for example, other elastomers (e.g., butyl elastomer, neutralized sulfonated EPDM, neutralized sulfonated butyl) in place of minor amounts of the EPDM, secondary inorganic fillers (e.g., talc, mica, clay, silicates, whiting) with total secondary filler content usually ranging from about 10 to about 150, about 0.3 to 2 phr. It is a feature of the present invention that the roof sheeting compound is fully cured prior to application.

The compounding ingredients can be admixed, utilizing an internal mixer (such as a Banbury mixer), an extruder, and/or a two-roll mill, or other mixers suitable for forming a viscous relatively uniform admixture. When utilizing a Banbury internal mixer, in a preferred mode, the dry or powdery materials such as carbon black are added first followed by the liquid process oil and finally the polymer (this type of mixing can be referred to as an upside-down mixing technique).

The resulting admixture is continuously sheeted to a thickness ranging from 5 to 200 mils, preferably from 35 to 60 mils, by conventional sheeting methods, for example, milling, calendering or extrusion. Preferably, the admixture is sheeted to at least 40 gauge (0.040 inches) which is the minimum thickness specified in standards set by the Roofing Council of the Rubber Manufacturers Association for non-reinforced black EPDM rubber sheets for use in roofing applications. In many cases, the admixture is sheeted to 40–45 gauge thickness since this is the thickness for a large percentage of "single-ply" roofing membranes used commercially.

Figure 2:
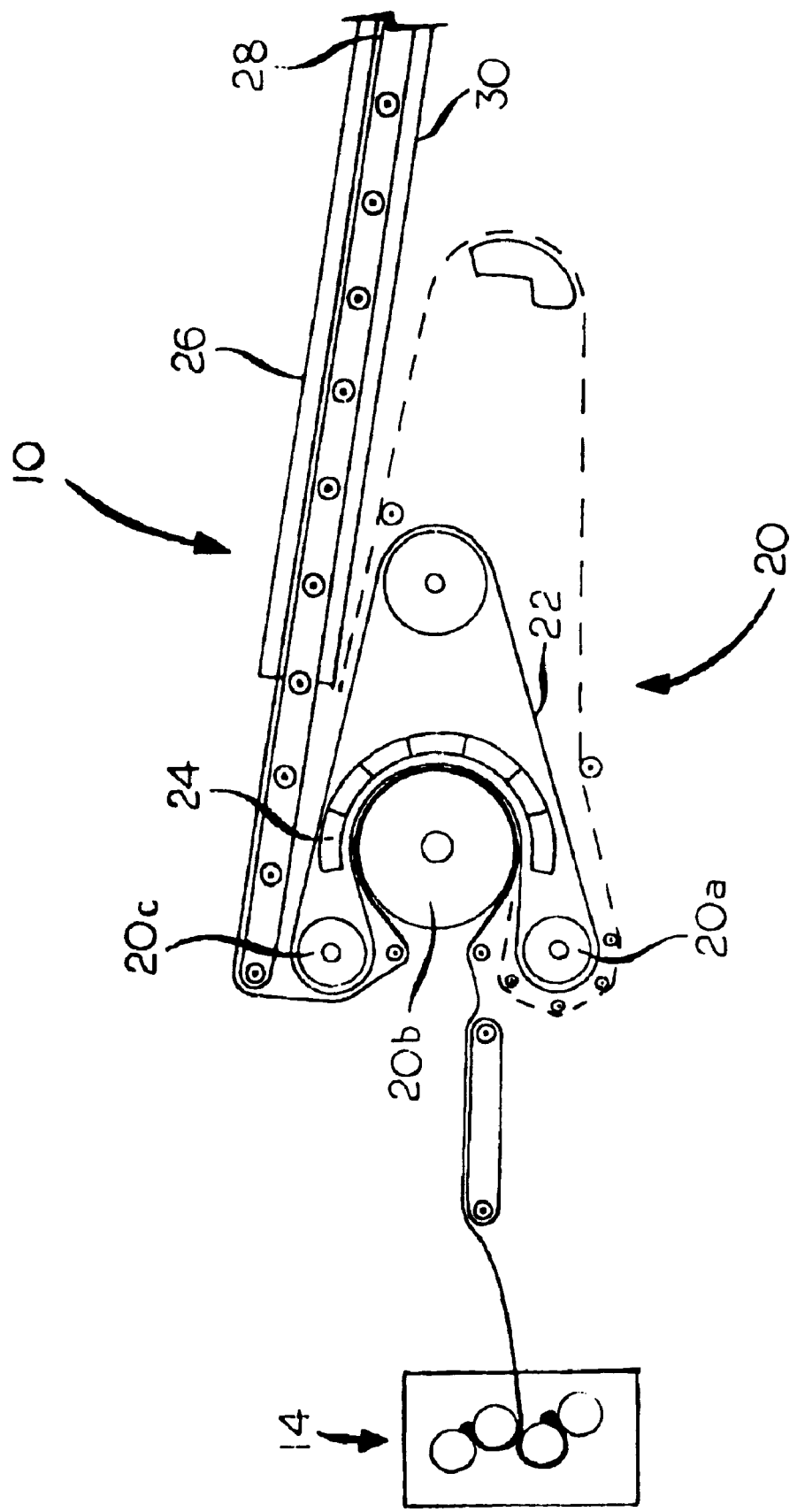
FIG. 2 is a side view of another embodiment of a method of curing a sheet formed of EPDM material.
Figure 3:
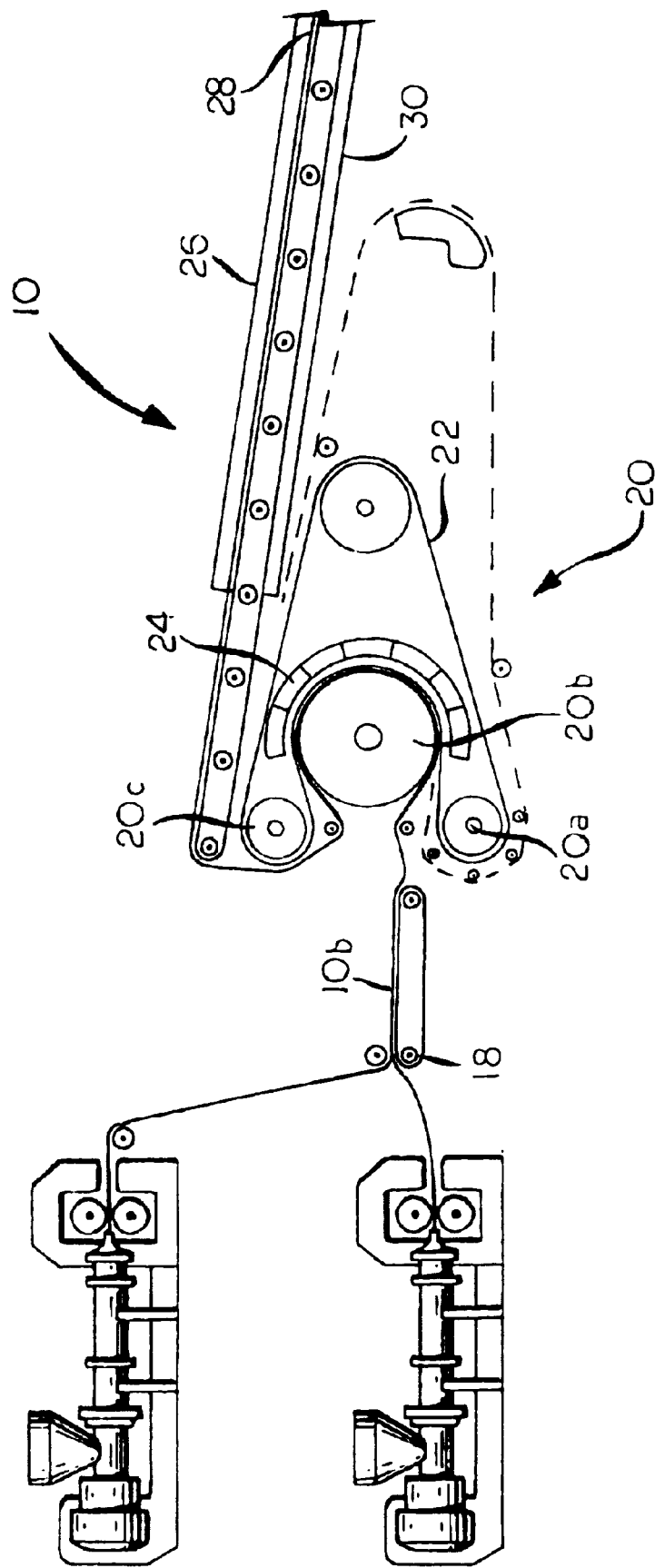
FIG. 3 is a side view of another embodiment of a method of curing a sheet formed of EPDM material.

For example, as shown in FIGS. 1 and 2, a single-ply sheet material 10a may be continuously formed by extrusion through an extruder 12 or by calendering through a calendar 14. In yet another embodiment, as shown in FIG. 3, a multi-ply sheet material 10b may be continuously formed by combining two or more single-ply sheet materials 10b through a pair of pinch rollers 18 or the like to form the multi-ply sheet material.

The continuously formed sheet material 10 is then simultaneously heated and pressed to partially cure the sheet material. The sheet material 10 is between about 10%–50% fully cured. As shown in FIGS. 1–3, the sheet material 10 may be simultaneously heated and pressed to partially cure the sheet material in a rotary heated press 20. The sheet material 10 is continuously heated to a temperature of about 176–232° C., preferably about 204° C.

The rotary heated press 20 includes three staggered rotating drums comprising a first drum 20a, a second drum 20b and a third drum 20c. A belt 22 extends around and is driven by three rotating drums 20a, 20b and 20c. Located adjacent the perimeter of the second drum 20b are a plurality of heaters 24. The heaters 24 warm the belt 22 to a temperature of between about 121–204° C. as the belt travels around the second drum 20b.

The sheet material 10 is fed in between the first drum 20a and second drum 20b, around the second drum 20b between the belt 22 and the second drum and exits between the second drum and the third drum 20c. The rotary heated press 20 continuously presses and heats the sheet material 10 between the belt 22 and the second drum 20b thereby eliminating porosity and/or air voids from the sheet material and partially cures the sheet material. Most any type of rotary heated press 20 may be used to simultaneously heat and press the sheet material 10 such as an AUMA rotary press commercially available from Berstorf. It will be appreciated that the diameter of the second drum 20b, speed of revolution of the second drum and temperature of the belt 22 affects the degree of partial cure of the sheet material 10. The faster the rotation of the second drum 20b, and/or the smaller the diameter of the second drum and/or the lower the temperature of the belt 22, the lower the degree of cure of the sheet material 10 from the rotary heated press 20.

The partially cured sheet material 10 from the rotary heated press 20 is then continuously fed through a curing oven 26 to finally fully cure the sheet material and form EPDM roofing membrane 28. As shown in FIGS. 1–3, the curing oven 26 includes a continuous conveying belt 30 for transporting the sheet material 10 and a heat source of a type well known in the art such as a plurality of infrared lamps or forced hot air (not shown) to heat and fully cure the sheet material and form the EPDM roofing membrane 28. It will be appreciated that the endless EPDM roofing membrane 28 may then be wound on a spool and cut to a desired length for later use as well known in the art.

The continuous multi-step cure process in accordance with the present invention obtains a fast manufacturing line and prevents the formation of voids from trapped air in the sheet material 10 as the sheet material is cured. It will be appreciated that multi-ply material typically separates during cure due to trapped air between the plies unless pressure and heat are applied simultaneously.

The patents and documents described herein are hereby incorporated by reference.

Having described presently preferred embodiments of the invention, it is to be understood that it may be otherwise embodied within the scope of the appended claims.

What is claimed is:

1. A method of continuously manufacturing and curing in-line a sheet of ethylene-propylene diene termonomer to form an EPDM roofing membrane, the method comprising the steps of:

forming a continuous sheet material of ethylene-propylene diene termonomer;

continuously heating and pressing the sheet material to partially cure the sheet material and remove any voids within the sheet material; and then continuously feeding the partially cured sheet material through a curing oven to fully cure the sheet material to form EPDM roofing membrane.

2. The method of claim 1 wherein the sheet material is a single-ply material.

3. The method of claim 1 wherein the sheet material is a multi-ply sheet material.

4. The method of claim 1 wherein the sheet material is continuously heated to a temperature of about 176–232° C.

5. The method of claim 1 wherein the sheet material is continuously heated to a temperature of about 204° C.

6. The method of claim 1 wherein the sheet material is continuously formed by extrusion.

7. The method of claim 1 wherein the sheet material is continuously formed by calendaring.

8. The method of claim 1 wherein the sheet material is simultaneously heated and pressed to partially cure the sheet material in a rotary heated press.

9. The method of claim 8 wherein the rotary heated press includes three staggered rotating drums comprising a first drum, a second drum and a third drum having a belt interconnecting and simultaneously driving all three rotating drums, a plurality of heaters are located adjacent the perimeter of the second drum and warm the belt to a temperature of between about 121–204° C. as the belt travels around the second drum.

10. The method of claim 9 wherein the sheet material is fed in between the first drum and second drum, around the second drum between the belt and the second drum and exits between the second drum and the third drum thereby continuously pressing and heating the sheet material between the belt and the second drum thereby eliminating porosity and/or air from the sheet material and partially curing the sheet material.

11. The method of claim 1 wherein the curing oven includes a continuous conveying belt for transporting the sheet material and a heat source to heat and fully cure the sheet material and form the EPDM roofing membrane.

12. A method of continuously manufacturing and curing in-line a sheet of ethylene-propylene diene monomer to form an EPDM roofing membrane, the method comprising the steps of:

forming a continuous sheet material of ethylene-propylene diene monomer;

continuously heating and pressing the sheet material in a rotary heated press to partially cure the sheet material and remove any voids within the sheet material; and then continuously feeding the partially cured sheet material through a curing oven to fully cure the sheet material to form EPDM roofing membrane.

13. The method of claim 12 wherein the sheet material is a single-ply material.

14. The method of claim 13 wherein the sheet material is a multi-ply sheet material.

15. The method of claim 12 wherein the sheet material is continuously heated to a temperature of about 176–232° C.

16. The method of claim 12 wherein the sheet material is continuously heated to a temperature of about 204° C.

17. The method of claim 14 wherein the sheet material is continuously formed by extrusion.

18. The process of claim 14 wherein the sheet material is continuously formed by calendaring.

19. The method of claim 12 wherein the rotary heated press includes three staggered rotating drums comprising a first drum, a second drum and a third drum having a belt interconnecting and simultaneously driving all three rotating drums, a plurality of heaters are located adjacent the perimeter of the second drum and warm the belt to a temperature of between about 176–232° C. as the belt travels around the second drum.

20. The method of claim 12 wherein the rotary heated press includes three staggered rotating drums comprising a first drum, a second drum and a third drum having a belt interconnecting and simultaneously driving all three rotating drums, a plurality of heaters are located adjacent the perimeter of the second drum and warm the belt to a temperature of between about 204° C. as the belt travels around the second drum.

21. The method of claim 17 wherein the sheet material is fed in between the first drum and second drum, around the second drum between the belt and the second drum and exits between the second drum and the third drum thereby continuously pressing and heating the sheet material between the belt and the second drum thereby eliminating porosity and/or air voids from the sheet material and partially curing the sheet material.

22. The method of claim 12 wherein the curing oven includes a continuous conveying belt for transporting the sheet material and a heat source to heat and fully cure the sheet material to form the EPDM roofing membrane.

* * * * *